June 15, 1965  H. H. MACKAL  3,189,223
LIQUID DISPENSING DEVICE
Filed May 18, 1964
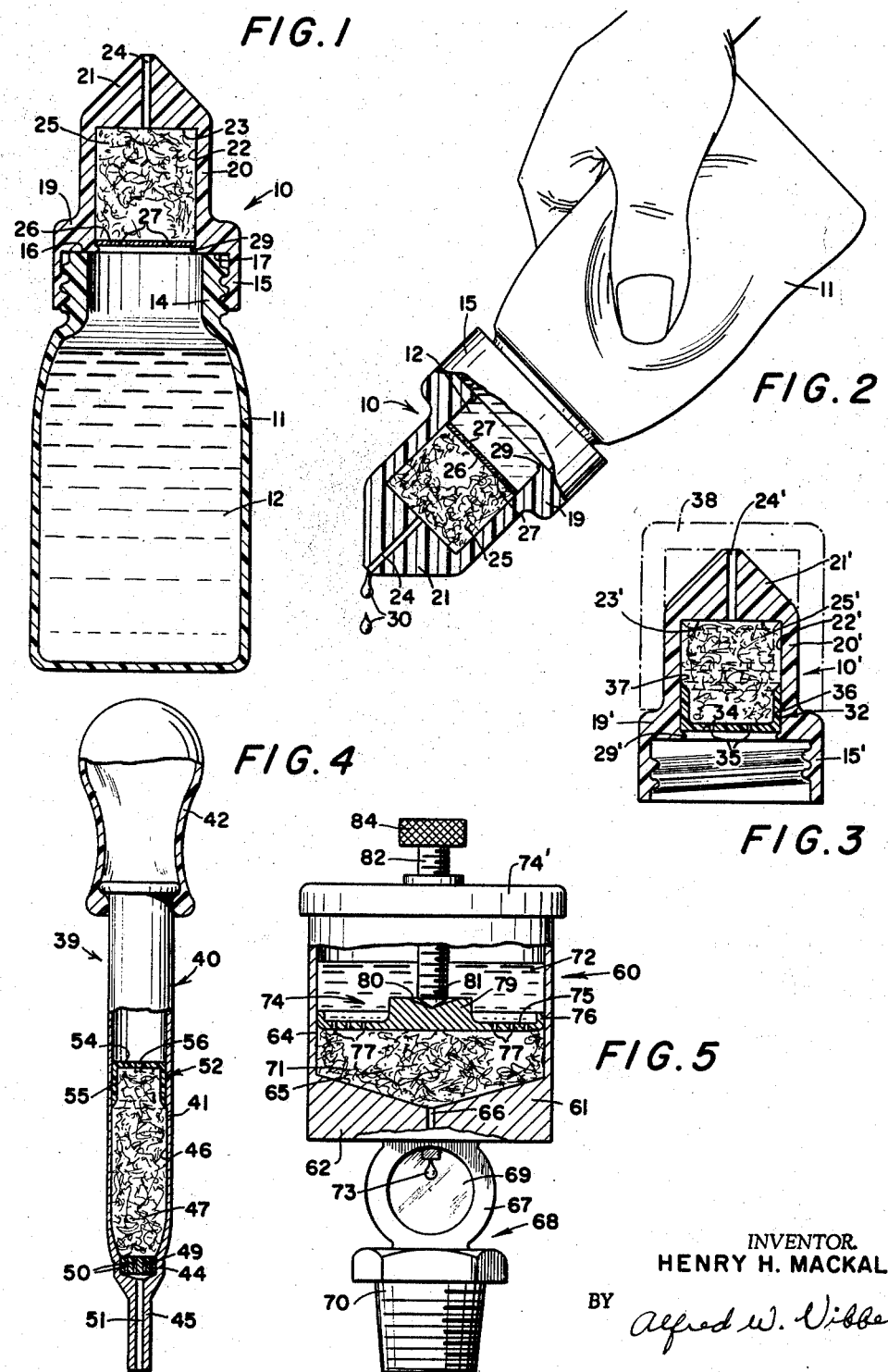
INVENTOR.
HENRY H. MACKAL
BY Alfred W. Vibber
ATTORNEY

United States Patent Office 3,189,223
Patented June 15, 1965

3,189,223
LIQUID DISPENSING DEVICE
Henry H. Mackal, Fort Lauderdale, Fla., assignor to Halkey-Roberts Corporation, Paramus, N.J., a corporation of New Jersey
Filed May 18, 1964, Ser. No. 368,120
17 Claims. (Cl. 222—1)

This invention relates to a liquid dispensing device. In certain of the disclosed embodiments the invention relates to nozzle-like devices adapted to be mounted upon a container the interior of which is intermittently subjected to increased pressure. In a further disclosed embodiment, the dispensing device is subjected to liquid to be dispensed under substantially constant gravity head.

The dispensing device of the invention in some embodiments thereof is particularly advantageous in the dispensing of low viscosity liquids in drop form. Typical of such use is that in the dispensing of liquids in amounts measured by the number of drops dispensed. Here there is a need for a fairly uniform rate of delivery of the drops regardless of the variations in dispensing pressures applied to the interior of the container. The dispensing device of the invention is also of advantage because of its effective control of the rate of dispensing of low viscosity liquids, such as those cotaining large amounts of water or alcohol, which tend to "run away" with ordinary dispensing devices once dispensing flow has started.

The invention has among its objects the provision of a novel dispensing device adapted to dispense liquid in drop form.

A further object of the invention lies in the provision of a novel dispensing device of the type indicated wherein the rate of drop delivery does not vary greatly regardless of changes in the dispensing pressure to which the liquid is subjected.

Yet another object of the invention lies in the provision of the novel combination of a container and a dispensing device of the type indicated, the container being of such character that the interior thereof may be subjected to intermittent increases in pressure whereby to dispense the contained liquid through the dispensing device.

A still further object of the invention lies in the provision of a novel improved liquid dispensing device incorporating means to vary the drop delivery rate of the device when the liquid therein is subjected to a substantially constant dispensing pressure.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in vertical axial section through a flexible walled squeeze bottle provided with a first embodiment of dispensing device in accordance with the invention;

FIG. 2 is a view partially in axial section and partially in side elevation of the combination of squeeze bottle and dispensing device shown in FIG. 1, the bottle being shown partially inverted and being squeezed to dispense liquid therefrom in drop form;

FIG. 3 is a view in vertical axial section through a second embodiment of dispensing device in accordance with the invention, an optionally employed closure cap for the closure device being shown mounted thereon, such cap being shown in phantom lines;

FIG. 4 is a view partially in side elevation and partially in vertical axial section through a medicine dropper having a liquid dispensing device incorporated therein, such device being made in accordance with a third embodiment of the invention; and FIG. 5 is a view partially in side elevation and partially in vertical axial section through a gravity actuated liquid drop dispensing device such as a lubricator for a bearing, such apparatus incorporating a liquid dispensing device in accordance with a fourth embodiment.

As apparent from the above, four embodiments of dispensing device in accordance with the present invention are shown herein. The first embodiment is illustrated in FIGS. 1 and 2, the second is shown in FIG. 3, the third shown in FIG. 4, and the fourth is illustrated in FIG. 5. Turning now to FIGS. 1 and 2, the closure device, which is generally designated by the reference character 10, is shown applied to a flexible walled squeeze bottle 11 made of plastic material. In FIG. 1 the bottle 11 is shown partially filled with a liquid 12 which is to be dispensed in drop form by the dispensing device in the manner shown in FIG. 2.

The bottle 11 is provided with an exteriorly threaded neck 14 upon which the dispensing device 10 is mounted. Device 10 has a main annular body portion 19 from which there depends an interiorly threaded skirt 15 which threadedly engages the neck 14, as shown. The dispensing device is sealed to the container neck by forcible engagement between the annular upper end surface 16 of the container neck and a confronting transversely disposed annular shoulder 17 on the bottom of body 19 radially inward of the skirt 15. Rising above body 19 coaxially thereof is a circular cylindrical sleeve 20 which terminates at its upper end in a generally solid frusto-conical end portion 21. Sleeve 20 has a vertically disposed elongated circular cylindrical cavity 22 therein, the cavity terminating at its upper end in a transverse wall 23. Extending axially through portion 21 is a dispensing passage 24 of relatively small diameter.

The cavity 22 in the sleeve 20 is substantially filled with a porous resiliently compressible body 25 which, in the described preferred embodiment, is in the form of a unitary cellular sponge body, the cells of which are of small size and continuous or open so as to present a large number of liquid conducting passages from one end to the other of the body. Disposed below the lower end of body 25 and preferably in contact therewith at all times is a substantially rigid disc-like plunger 26 which substantially spans the cavity 22 transversely thereof and is slidable longitudinally of the cavity. In the embodiment shown, body 26 is provided with a plurality (two shown) of holes 27 therethrough so that liquid from the container travels by way of such holes past or through the plunger disc into the body 25. The disc 26 may be retained in the cavity 22 by being snapped past a radially shallow inwardly projecting bead 29 on the lower end of the wall of the cavity. The disc 26 may, if desired, be secured to the lower or inner end of the body 25 as by being adhered thereto, although this is not a necessary feature of the construction shown.

When it is desired to dispense liquid 12 from the bottle 11, the bottle is tipped into an at least partially inverted position as shown in FIG. 2, following which the interior of the bottle is subjected to increased pressure. With the squeeze bottle shown, such increased pressure is generated by subjecting the walls of the bottle to a squeezing action, as indicated. Assuming that the dispensing device has been used before, the body 25 will, in its relaxed condition as shown in FIG. 1, be substantially saturated with liquid. The subjection of the liquid overlying the inner (and then upper) face of disc 26 (FIG. 2) to increased pressure will cause the disc to be thrust in an outward direction in cavity 22. Such action partially compresses the resiliently compressible porous body 25 thereby to express some of the liquid contents therein through the dispensing passage 24 from which it issues in the form of drops 30. Such partial compression of the body 25 causes a constriction in the total effective area of the passages through the walls of the cells of the body so that liquid then flows therethrough, under the combined action of gravity and of the increased dispensing pressure, at a rate which depends primarily upon the characteristics of the body 25 and but little upon the dispensing pressure in excess of a predetermined minimum effective value. Thus as dispensing pressure increases, the total dispensing passage area through body 25 decreases correspondingly. Accordingly, the rate of dispensing of drops 30 from the dispenser is not substantially affected by the magnitude of the effective dispensing pressure.

When such dispensing pressure is removed from the contents of the bottle 11, the dispensing of liquid through device 10 substantially ceases, even though the bottle remains inverted, because of the capillary action of the fine passages through the body 25. The body 25 and plunger disc 26 immediately regain their initial condition and position, respectively, shown in FIG. 1. Such action causes a sucking back of undispensed liquid in the dispensing passage 24, and thus a sharp cut-off in the delivery of drops. Thus the delivery of liquid through the device 10 is under accurate control at all times.

The second illustrative embodiment of dispensing device in accordance with the invention is shown in FIG. 3, wherein parts of the device which are similar to those of FIGS. 1 and 2 are designated by the same reference characters with an added prime. The dispensing device 10' of FIG. 3 is essentially the same as the device 10 described above except for the construction of the plunger device which is associated with the lower or inner end of the compressible porous body 25'. The plunger device of FIG. 3, which is generally designated by the reference character 32, is generally in the form of an upright cup having a disc-like transverse end member 34 with a plurality of liquid conducting passages 35 therethrough. Member 32 has an upstanding sidewall in the form of a circular cylindrical sleeve 36 which receives the lower end of the porous body 25' therewithin and which accurately but slidably engages the wall of the cavity 22'. The sidewall 36 of member 32 has an axial length such that when its outer end 37 engages the outer end 23' of the cavity, as shown in phantom lines at 32', the open-celled body 25', although partially compressed, presents a substantial total effective liquid passage therethrough. The construction of the dispensing device shown in FIG. 3, therefore, prevents the effective closing of the device by the imposition of an unduly high dispensing pressure to the interior of the container.

If desired, the dispensers 10 and 10' may be provided with a closure cap. One such cap, designated 38, is shown in phantom lines in FIG. 3, such cap having telescopic frictional engagement with the outer wall of sleeve portion 20' of device 10'. The skirt of cap 38 may alternatively be threaded, to mate with threads on the outer surface of sleeve 20'.

In FIG. 4 there is shown a medicine dropper incorporating a further embodiment of liquid dispensing device in accordance with the invention. Such medicine dropper, which is generally designated by the reference character 39, has a body 40 which may be in the form of a glass tube having a sidewall 41, a rubber bulb 42 being secured to the upper end of such body in a conventional manner. Adjacent the lower end of body 40 there is provided a constricted thickened neck portion 44 which merges with a dispensing nozzle portion 45.

Within the cavity 46 in the body 40 above the neck 44 there is disposed an elongated resiliently compressible porous body 47, which may be of the same character as the bodies 25 and 25' of the first two described embodiments. The lower end of body 47 rests upon a screen or sieve-forming insert 49 having a plurality of small diametered passages 50 therethrough. Screen 49 prevents the sucking up of any solid matter of appreciable size into the cavity 46 and porous body 47 therewithin upon the filling of the dropper with liquid in the normal manner.

Liquid contained in the upper end of body 40 thus passes through the porous body 47 through the screen or sieve 49 and into the dispensing passage 51 upon the imposition of such liquid to increased pressure by the squeezing of the bulb 42. The upper end of the porous body 47, as it is shown in FIG. 4, is received within an inverted cup-like body 52 having an upper transverse disc-like end 54 provided with one or more passages 56 therethrough. The sidewall 55 of member 52 is of substantial length, and accurately and slidably engages the inner wall of the body 40 of the medicine dropper. Here again, the rate of dispensing of drops of liquid from the nozzle 45 is generally unaffected by variations in dispensing pressure, in excess of a predetermined minimum effective pressure, applied to the bulb 42.

The dispensing device 60 shown in FIG. 5 may be employed to dispense oil at a slow predetermined rate to a bearing. Device 60 is particularly characterized by its ease of microscopic adjustment, its economy of manufacture and maintenance, and by the fact that it is virtually non-clogging. Such lubricating device 60 has a body 61 of generally upright cup shape, such body having a transverse base 62, a circular cylindrical sidewall in the form of a sleeve 64, and a removable cap 74' closing the upper end of sleeve 64. The lower end of the cavity within the body 61 is of conical configuration, there being a central dispensing passage 66 leading downwardly from the lower end of the cavity to an upper sight chamber 67 of a fitting 68. Portion 67 may be provided with a transparent wall 69 whereby the dispensing of oil droplets 73 from passage 66 may be observed. The lower end of fitting 68 is provided with a threaded nipple 70 whereby the lubricating device may be mounted on a bearing (not shown).

The lower end of the cavity within body 61 is filled with a resilient compressible porous body 71. The space in body 61 above body 71, with the exception of the mechanism 74 to be described, is filled to a substantial extent with a body of oil 72. Oil 72 seeps downwardly through the porous body 71 at a rate determined by the degree of compression of such body, and hence the degree of construction of the total effective area of the passage therethrough, and thence travels through passage 66 to be discharged therefrom in the form of drops 73, as above explained. The degree of compression of body 71 in this instance is determined by a mechanism 74 which includes a disc-like body 75 having a shallow upwardly extending flange 76 on its rim. The body 75 accurately but slidingly engages the inner sidewall of the portion 64 of body 61. Member 75 is provided with a plurality of openings 77 therethrough through which oil travels downwardly into body 71. Member 75 is provided with an upstanding central boss 79 having an upwardly facing conical seat 80 centrally therein. A central screw 82 threaded into the cap 74' of the device has its lower end 81 of conical shape, such end being received within the seat 80. It will be seen that when screw 82 is advanced to varying degrees by turning thumb knob 84 on its upper end, the compressible porous body 71 will be compressed to varying degrees as desired whereby the total effective passage area therethrough may be adjusted to dispense drops 73 at a predetermined desired rate.

As above indicated, the resilient compressible porous bodies 25, 25', 47, and 71 of the above-described embodiments of dispensing device are preferably made of continuous cell sponge material. Such material is economical, and its characteristics such as cell size and degree of resilience may be varied within wide limits; once chosen, however, such characteristics can be closely controlled in production. A non-limiting example of such material is continuous cell flexible polyurethane foam. Such foam is basically the reaction of a polyol (either a polyether or a polyester) and polyisocyanate made to rise or foam by a blowing agent. Other materials which may be employed are various "wools," which may be made of strands felted, woven, or otherwise compacted together. Such strands may be natural or synthetic fibers, and made of metal, organic, or inorganic material. In general, the bodies made of wools are not so resilient as the resilient compressible sponge materials, nor can total effective dispensing areas through them be predetermined and controlled with the precision yielded by the resilient porous synthetic sponge materials. Additionally, such sponge materials are numerous, and can readily be chosen with a view to their compatibility with the liquid to be dispensed, as well as their compression and liquid dispensing characteristics. The liquid dispensing characteristics of the resilient porous bodies in question and thus of the dispensing device can, as noted, be varied by the choice of material of which the bodies are made. Additionally, somewhat different dispensing actions with resilient porous bodies of the same relaxed structure may be obtained by varying the degree of initial compression (FIG. 1) of the resilient porous body in the cavity in the dispensing device, and by the length of the cavity of the dispensing device and thus the length of travel of the liquid, in being dispensed, through the resilient porous body therein. Thus with the resilient porous body only lightly initially compressed in the cavity, a somewhat freer flow of liquid is obtained through the dispensing device, upon exceeding the minimum required dispensing pressure within the container, than is obtained when the resilient porous body is very substantially compressed initially.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

What is claimed is:

1. A liquid dispensing device comprising a hollow body, said body having a cavity therewithin adapted to communicate at its inner end with the interior of a liquid containing container, the body having a liquid dispensing orifice therein communicating with the cavity at a location remote from the inner end of the cavity, a compressible porous body mounted and held within the cavity so as to span the portion of the cavity in advance of the orifice and a disc-like member substantially spanning the cavity inwardly of and engaging the outer end of the compressible porous body, the disc-like member presenting a dispensing passage therepast to the compressible porous body, the disc-like member being reciprocable in the cavity so as to compress the compressible porous body upon an increase in pressure applied to its inner surface.

2. A liquid dispensing device as claimed in claim 1, comprising means to limit travel of the disc-like member toward the dispensing orifice to a point at which the compressible porous body remains porous.

3. A liquid dispensing device as claimed in claim 1, wherein the compressible porous body is composed of a sponge-like cellular material.

4. A liquid dispensing device as claimed in claim 3, wherein said material is in the form of a sponge having cells which present continuous passages therethrough.

5. A liquid dispensing device as claimed in claim 3, wherein the compressible porous body is appreciably resiliently compressible so as to become compacted in the cavity in a direction toward the dispensing orifice upon disposing the container and the device so that a body of liquid lies above the disc-like member and upon an increase in the dispensing pressure to which the liquid in the cavity and porous body is subjected, and to regain substantially its original size and shape as confined within the cavity upon the removal of such increased dispensing pressure.

6. A liquid dispensing device as claimed in claim 3, comprising means for selectively subjecting the compressible porous body to predetermined desired degrees of compaction within the cavity, whereby to vary the effective total area of the liquid dispensing passages therethrough.

7. A liquid dispensing device as claimed in claim 3, wherein the disc-like member forms the transverse end wall of a cup-shaped member having a tubular side wall receiving the inner end of the compressible porous body within it, and wherein the dispensing passage past the disc-like member comprises at least one passage through the disc-like member.

8. A liquid dispensing device as claimed in claim 7, wherein the outer end of the cavity has an inwardly directed shoulder, and the axial length of the side wall of the cup-shaped member is such that upon an increase in dispensing pressure upon the liquid the outer edge of the side wall of the cup-shaped member engages said shoulder to stop further compaction of the compressible porous body while the compressible porous body remains porous.

9. In combination, a container for liquid to be dispensed therefrom, and a liquid dispensing device connected to the container, said device comprising a hollow body having an elongated generally cylindrical cavity therewithin communicating at its inner end with the interior of the container, the body having a liquid dispensing orifice therein communicating with the cavity at a location remote from the inner end of the cavity, and a compressible porous body mounted within the cavity so as to span the portion of the cavity in advance of the orifice, and a disc-like member spanning the cavity inwardly of and engaging the outer end of the compressible porous body, the disc-like member presenting a dispensing passage therepast to the compressible porous body, in the liquid dispensing position the cavity and the compressible porous body being substantially filled with said liquid under a gravity head.

10. The combination claimed in claim 9, wherein the compressible porous body is composed of a sponge-like cellular material.

11. The combination claimed in claim 10, wherein the said material is in the form of a sponge having cells which present continuous passages therethrough.

12. The combination as claimed in claim 9, wherein the compressible porous body is appreciably resiliently compressible so as to become compacted toward the dispensing orifice upon an increase in the dispensing pressure to which the liquid in the cavity and porous body is subjected, and to regain substantially its original size and shape as confined within the cavity upon the removal of such increased dispensing pressure.

13. The combination as claimed in claim 12, wherein the container is flexible-walled, whereby the squeezing of the container walls with the container positioned with the dispensing device downwardly and the porous compressible body substantially filled with liquid causes the said body to be compacted toward the dispensing orifice of the dispensing device and liquid to be dispensed through the compacted porous body and the orifice.

14. A liquid drop dispensing device, comprising a generally vertically disposed cup-like body adapted to contain a body of said liquid and having a generally cylindrical cavity disposed longitudinally therein, a drop dispensing orifice in the body communicating with the lower end of the cavity, a compressible porous body filling the lower end of the cavity, and means for adjustably compressing the porous body whereby to vary the rate of passage of said liquid from the upper part of the cup-like body through the porous body to the dispensing orifice comprising a disc-like member in the cavity, substantially spanning the cavity transversely thereof, and presenting a dispensing passage therepast to the compressible porous body, and means adjustably to thrust the disc-like member downwardly to compress the porous body to predetermined desired extents.

15. A method of dispensing liquid through an orifice in a container, which comprises disposing a porous resiliently compressible body in a conduit connected between the interior of the container and the orifice, said body substantially spanning the conduit, disposing a disc-like plunger member substantially spanning the conduit in engagement with the end of the compressible body remote from the orifice, the disc-like member presenting a dispensing passage therepast to the porous compressible body, at least partially filling the container with liquid to be dispensed, disposing the container with the dispensing orifice downwardly so that the conduit and porous compressible body are substantially filled with liquid, and subjecting the interior of the container to increased pressure to compact the porous compressible body toward the dispensing orifice of the dispensing device and liquid to be dispensed through the compacted porous body and the orifice.

16. A method as claimed in claim 15, wherein the dispensing pressure is applied intermittently.

17. A method as claimed in claim 15, wherein the container is flexible-walled, and comprising creating said liquid dispensing pressure by applying inwardly directed container wall depressing force to the container.

References Cited by the Examiner

UNITED STATES PATENTS

| 1,122,869 | 12/14 | Davis | 222—335 |
| 2,684,789 | 7/54 | Marchant | 222—545 X |
| 2,783,091 | 2/57 | Haldy | 222—189 |

FOREIGN PATENTS

| 936,867 | 9/63 | Great Britain. |

LOUIS J. DEMBO, *Primary Examiner.*